(12) United States Patent
Hou et al.

(10) Patent No.: US 10,724,711 B1
(45) Date of Patent: Jul. 28, 2020

(54) EDGE-LIT DOWNLIGHT APPARATUS

(71) Applicant: XIAMEN ECO LIGHTING CO. LTD., Xiamen (CN)

(72) Inventors: Shouqiang Hou, Xiamen (CN); Yongzhe Dong, Xiamen (CN); Xiaoliang Wen, Xiamen (CN); Anyong Liu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/439,703

(22) Filed: Jun. 13, 2019

(30) Foreign Application Priority Data

Jan. 30, 2019 (CN) ...................... 2019 2 0162060 U (51) Int. Cl.
| | | |
|---|---|---|
| *F21V 17/10* | (2006.01) | |
| *F21V 8/00* | (2006.01) | |
| *F21V 31/00* | (2006.01) | |
| *F21Y 103/10* | (2016.01) | |
| *F21Y 115/10* | (2016.01) | |
| *F21Y 105/00* | (2016.01) | |

(52) U.S. Cl.
CPC ............ *F21V 17/10* (2013.01); *F21V 31/005* (2013.01); *G02B 6/0083* (2013.01); *G02B 6/0085* (2013.01); *F21Y 2103/10* (2016.08); *F21Y 2105/00* (2013.01); *F21Y 2115/10* (2016.08)

(58) Field of Classification Search
CPC ...... F21V 17/10; F21V 23/003; F21V 23/006; F21V 23/009; F21V 31/005; F21S 10/005; F21S 8/04
See application file for complete search history.

(56) References Cited

U.S. PATENT DOCUMENTS

| | | | | |
|---|---|---|---|---|
| 9,921,364 | B2* | 3/2018 | Boulanger | ............ G02B 6/0073 |
| 2014/0071687 | A1* | 3/2014 | Tickner | ................... F21V 21/03 |
| | | | | 362/294 |
| 2016/0018093 | A1* | 1/2016 | Van Winkle | .......... F21V 3/0625 |
| | | | | 362/311.02 |
| 2018/0128434 | A1* | 5/2018 | Moon | ................... F21V 23/005 |
| 2018/0224092 | A1* | 8/2018 | Hsieh | ...................... F21V 17/10 |
| 2018/0259701 | A1* | 9/2018 | Yuki | ......................... F21S 2/00 |
| 2018/0306967 | A1* | 10/2018 | Fernandez | ............ F21V 7/0083 |
| 2019/0113193 | A1* | 4/2019 | Serak | ................... G02B 6/0031 |

\* cited by examiner

*Primary Examiner* — Julie A Bannan
(74) *Attorney, Agent, or Firm* — Chun-Ming Shih; Lanway IPR Services (57) ABSTRACT

An edge-lit downlight apparatus includes a surface housing having a base and a side wall, a laminate, and a light guide module. The downlight apparatus includes a circuit board having an inner and an outer surface wall. The downlight apparatus includes first brackets, and each includes a body and a contacting part. The body of the first bracket abuts against the side wall of the surface housing, and the contacting part of the first bracket extends outward from the body and abuts against the laminate. The downlight apparatus includes fasteners passing through the contacting parts of the first brackets, the laminate, and being removably connected to the surface housing. LED chips are located on the inner surface wall of the circuit board.

20 Claims, 7 Drawing Sheets

EDGE-LIT DOWNLIGHT APPARATUS

FIELD

The present invention is related to a downlight apparatus, and more particularly related to an edge-lit downlight apparatus.

BACKGROUND

A conventional edge-lit downlight apparatus generally has the following drawbacks:

1) Generally the surface ring of a traditional edge-lit downlight apparatus is manufactured by the die-casting process so as to ensure it passes the Temperature Rise Test. However, the die-casting process is complex, time-consuming, and costly.

2) For a traditional edge-lit downlight apparatus, only screws are used to press the laminate against the optical components. The performance of light emission is not satisfactory.

3) Conventionally, the edge-lit downlight apparatus is mounted on the ceiling via a bracket and screws. Such installation method is inefficient and requires more installation time, which leads to higher installation cost.

4) The downlight apparatus is usually not waterproof or the waterproof level is not high, which limits the scope of use. Also, there may be safety concerns in some applications.

SUMMARY OF INVENTION

The present disclosure provides an edge-lit downlight apparatus configured with a reasonable structure, good heat dissipation effect and good light-emitting effect.

In one embodiment, the edge-lit downlight apparatus includes a surface housing having a base and a side wall, a laminate, and a light guide module located between the surface housing and the laminate. The edge-lit downlight apparatus further includes a circuit board located in a space formed by the surface housing, the light guide module and the laminate. The circuit board has an inner surface wall and an outer surface wall. The edge-lit downlight apparatus includes at least two first brackets, and each of the first brackets includes a body and a contacting part. For each of the first brackets, the body of the first bracket abuts against the side wall of the surface housing, and the contacting part of the first bracket extends outward from the body and abuts against the laminate. The edge-lit downlight apparatus includes a plurality of fasteners pass through the contacting parts of the first brackets, the laminate, and are removably connected to the surface housing. The outer surface wall of the circuit board contacts the side wall of the surface housing via a heat dissipation material, and there are a plurality of LED chips located on the inner surface wall of the circuit board.

The circuit board may be ring-shaped or square-shaped. The circuit board may be flexible, and may be an aluminum-based printed circuit board.

The surface housing may be made of plastic. The light guide module may include a diffuser, a light guide plate, a light reflector, and a foam layer. The surface housing may have a first protrusion, which is ring-shaped and coaxial with the surface housing. The laminate may abut against the first protrusion, and have a recess around the center of the laminate.

The edge-lit downlight apparatus may further include a mylar film and a water-proof foam arranged between the second protrusion and the side wall of the surface housing.

The first protrusion may have a top wall having a second protrusion, and the second protrusion is ring-shaped and coaxial with the surface housing.

In some embodiments, the edge-lit downlight apparatus may further include a back housing and at least two second brackets. Each of the second brackets includes a first part, a second part, and a third part. The first part is connected to the laminate, the second part abuts against the second protrusion, and the third part extends toward a center of the surface housing.

The at least two first brackets may be L-shaped.

In some embodiments, the edge-lit downlight apparatus may further include a driving module located on the laminate.

The laminate may have a first side facing a forward direction and a second side facing opposite to the forward direction, and the driving module is located on the second side of the laminate.

In some embodiments, the surface housing has a first protrusion, and the first protrusion is ring-shaped and coaxial with the surface housing.

The laminate may abut against the first protrusion. The first protrusion may have a top wall having a second protrusion, which is ring-shaped and coaxial with the surface housing.

The advantages of the present disclosure include at least the following:

(1) The circuit board provided with the light module and the surface housing are adhered by heat dissipation material (e.g., heat dissipation tape or heat dissipation gel) so as to enhance the heat dissipation performance.

(2) The first brackets engage with the fasteners to increase the contact area, so that the positioning between the components may be more precise and firmer. In this way, the misalignment or gap of the optical components due to assembly issues may be avoided. It can be understood that such misalignment or gap may cause water ripple, which results in poor light-emitting effect. With the configuration proposed by the present disclosure, the optical efficiency and light quality may be greatly enhanced.

DETAILED DESCRIPTION

To make the objectives, technical solutions and advantages of the present invention clearer, with reference to the accompanying drawings and the following embodiments, some embodiments are described in further detail. It is to be understood that the description is not to be considered as limiting the scope of the present invention.

The present disclosure relates to the edge-lit downlight apparatus having good heat dissipation effect. Meanwhile, the first bracket and the fasteners are configured to improve the pressing effect of the laminate to the optical components, so the light-emitting effect may be enhanced.

Refer to FIGS. 1-5. In a first embodiment, the edge-lit downlight apparatus includes a surface housing 10 having a base and a side wall, a laminate 20, and a light guide module 30 located between the surface housing 10 and the laminate 20.

The surface housing 10 may be ring-shaped, and includes an L-shaped cross-section. A base of the surface housing 10 extends toward a central axis of the surface housing 10 to support other components of the edge-lit downlight apparatus.

The edge-lit downlight apparatus further includes a circuit board 50 located in a space formed by the surface housing 10, the light guide module 30 and the laminate 20. The circuit board has an inner surface wall and an outer surface wall. The edge-lit downlight apparatus includes at least two first brackets 60. In this embodiment, the first brackets 11 are L-shaped, and each of the first brackets 60 includes a body and a contacting part.

The first brackets 60 are symmetrical with respect to the central axis of the surface housing 10. For each of the first brackets 60, the body of the first bracket 60 abuts against the side wall of the surface housing 10, and the contacting part of the first bracket 60 extends outward from the body and abuts against the laminate 20.

The edge-lit downlight apparatus also includes a plurality of fasteners 40 pass through the contacting parts of the first brackets 60, the laminate 20, and are removably connected to the surface housing 10. The outer surface wall of the circuit board 50 contacts the side wall of the surface housing 10 via a heat dissipation material. The heat dissipation material may be a heat dissipation tape or heat dissipation gel. In this embodiment, the circuit board 50 is ring-shaped. A light module 51 including a plurality of LED chips is located on the inner surface wall of the circuit board 50 to emit light toward the light guide plate 32.

The circuit board 50 may be aluminum-based, and may be an aluminum-based printed circuit board. The surface ring 10 may be made by plastic material. The circuit board 50 and the surface ring 10 could work together to provide good heat dissipation effect.

Figure 4:
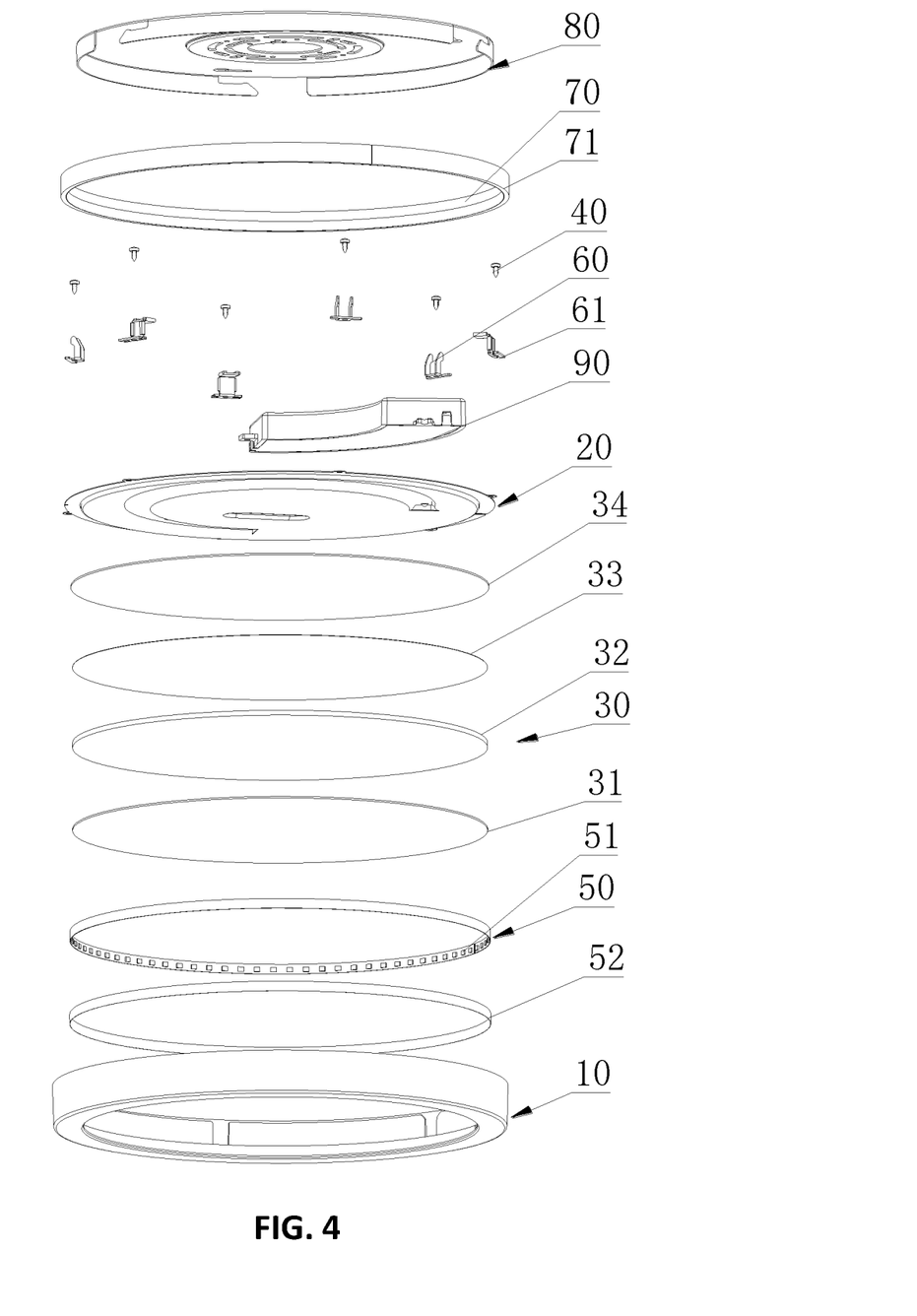
FIG. 4 is an exploded view of the edge-lit downlight apparatus in accordance with the first embodiment of the present disclosure.

Refer to FIG. 4. The light guide module 30 includes a diffuser 31, a light guide plate 32, a light reflector 33, and a foam layer 34.

Figure 1:
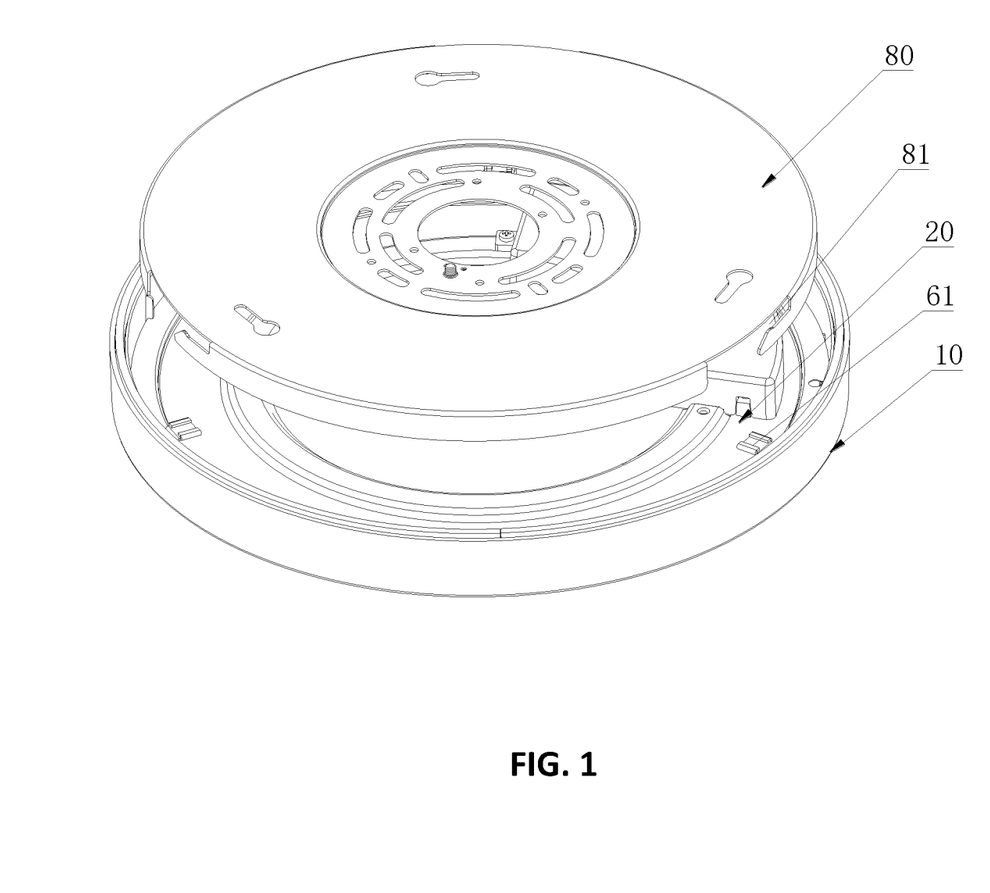
FIG. 1 is a schematic view of the edge-lit downlight apparatus in accordance with the first embodiment of the present disclosure.
Figure 2:
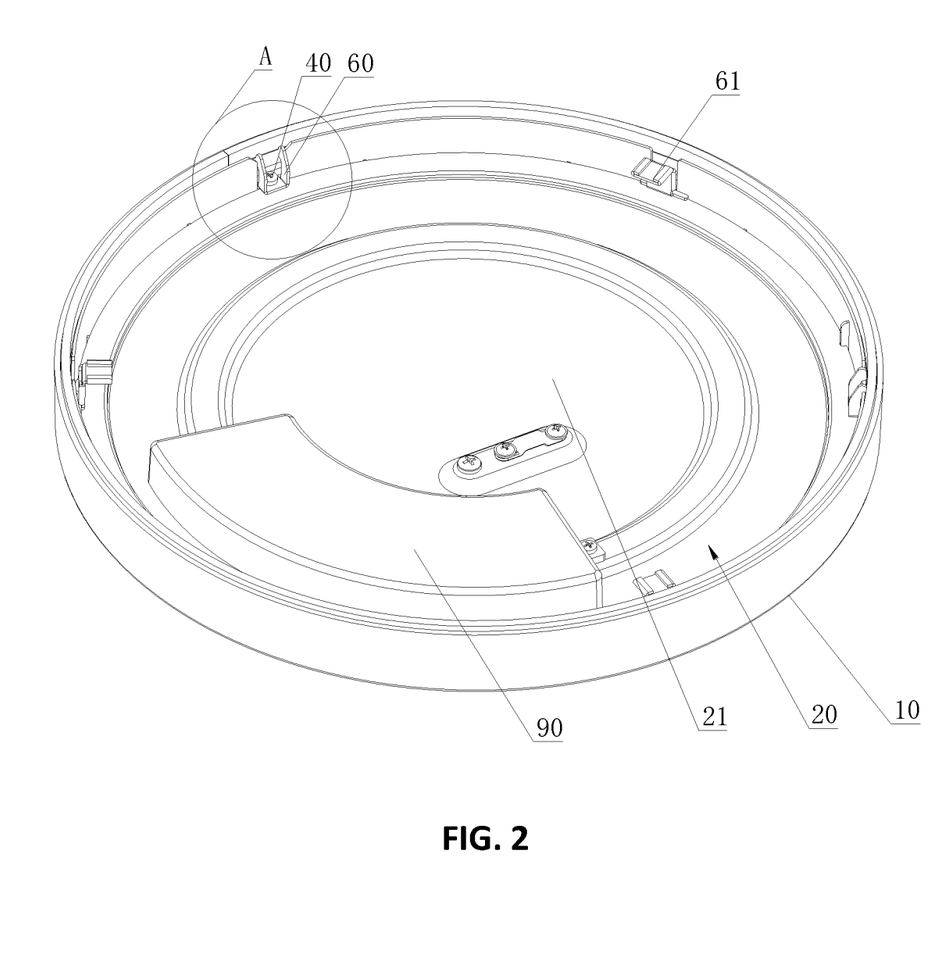
FIG. 2 is a schematic view of the edge-lit downlight apparatus in accordance with the first embodiment of the present disclosure, where the back plate is removed.
Figure 5:
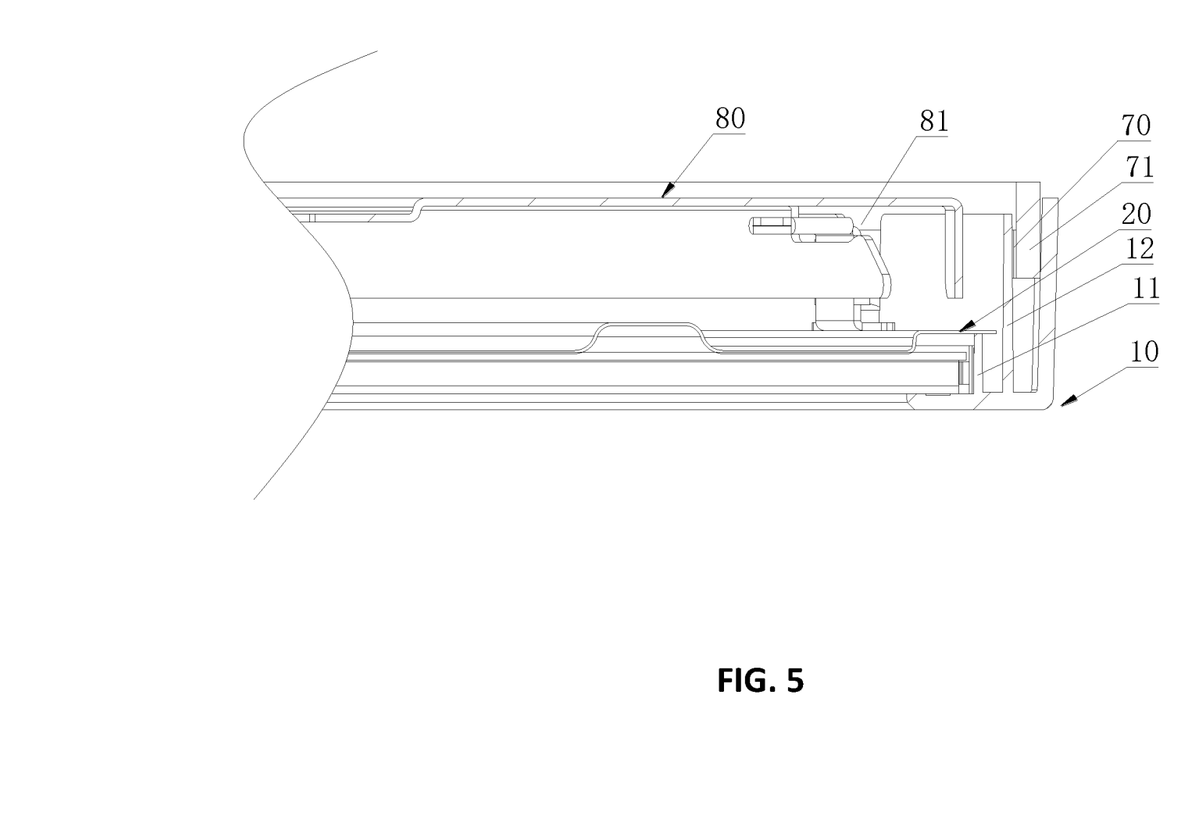
FIG. 5 is a cross sectional view of the edge-lit downlight apparatus in accordance with the first embodiment of the present disclosure.

Refer to FIGS. 2, 4 and 5. The surface housing 10 has a first protrusion 11, which is ring-shaped and coaxial with the surface housing 10. The laminate 20 abuts against the first protrusion 11 of the surface housing 10. The laminate 20 has a recess 21 around the center of the laminate 20, and the recess 21 abuts against the foam layer 34. The laminate 20 engages with the first protrusion 11 to provide better waterproof performance.

Figure 3:
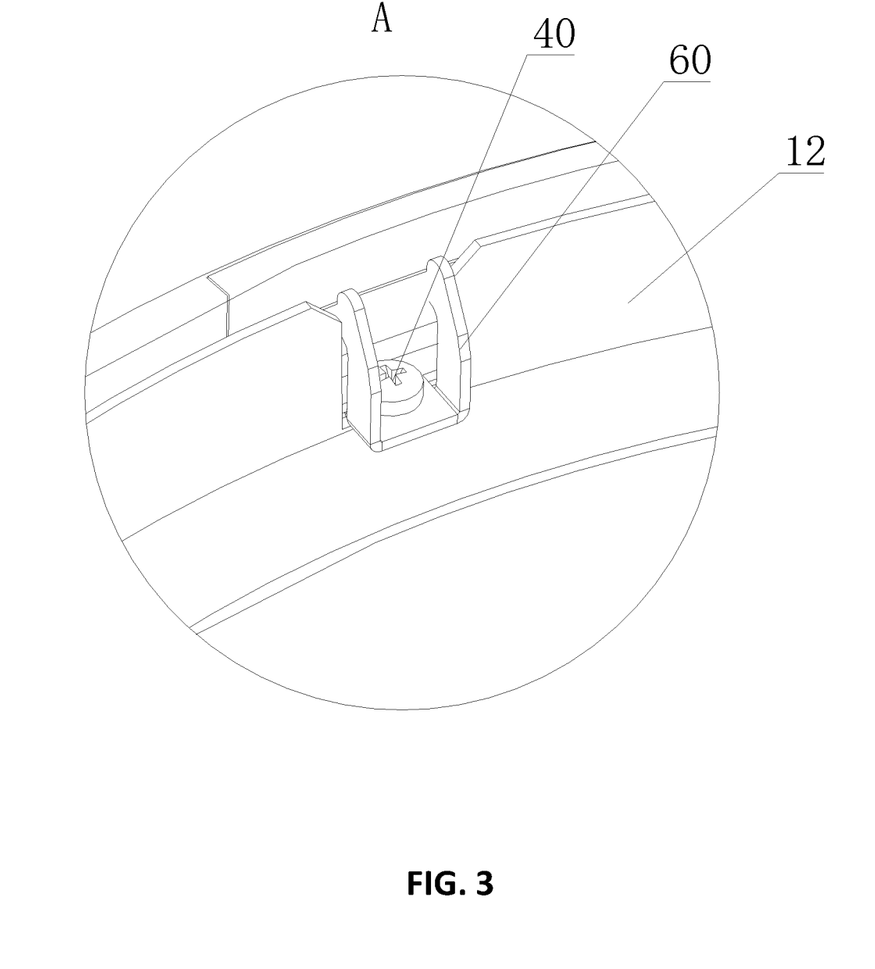
FIG. 3 is an enlarged view of the portion indicated by "A" in FIG. 2.

Refer to FIG. 3 and FIG. 5. The first protrusion 11 has a top wall having a second protrusion 12, and the second protrusion 12 is also ring-shaped and coaxial with the surface housing 10.

Refer to FIG. 4 and FIG. 5. The edge-lit downlight apparatus further includes a mylar film 70 and a water-proof foam 71 arranged between the second protrusion 12 and the side wall of the surface housing 10.

One end of the water-proof foam 71 protrudes from the surface housing 10 in an axial direction of the surface housing 10. The edge of the laminate 20 abuts against a sidewall of the second protrusion 12. The body abuts against an inner sidewall of the second protrusion 12.

In view of the above descriptions, the water-proof foam 71 and the mylar film 70 are configured to enhance the waterproof level such that the edge-lit downlight apparatus may be adopted safely in a variety of applications.

Refer to FIGS. 2 and 4. The edge-lit downlight apparatus include a back housing 80 and at least two second brackets 61. Each of the second brackets 61 includes a first part, a second part, and a third part. The first part is connected to the laminate 20, the second part abuts against the second protrusion 12, and the third part extends toward a center of the surface housing 10.

In the embodiment, the fasteners 40 may pass through a first part and the laminate 20 in sequence. And the fasteners 40 may be connected to or detached from the first protrusion 11, such that the second brackets 61 may also press against the fasteners 40. As an example, the fasteners 40 may be screws.

In order to conveniently take out the first brackets 60 and the second brackets 61, the second protrusion 12 is configured with a plurality of openings such that the base and the first part may pass through. The openings extend toward a top of the second protrusion 12 in the axial direction. In this way, the first brackets 60 is L-shaped facing toward an external side of the surface housing 10, and the second brackets 61 is Z-shaped.

The back housing 80 includes a bottom wall and a ring-shaped sidewall. The back housing 80 covers the surface housing 10, and the opening of the back housing 80 faces toward the surface housing 10. The laminate 20 and the light guide module 30 are respectively configured between the back housing 80 and the surface housing 10. The sidewall of the back housing 80 is configured with at least two L-shaped notches 81. One end of the notch 81 extends toward one end of the sidewall facing away the bottom wall in an axial direction of the back housing 80. The at least two notches 81 respectively corresponds to the at least two second brackets 61. The third part extends into the corresponding notch 81 and is movably disposed along the notch 81.

In view of the above, the bottom wall of the back housing 80 could fixed onto the ceiling. The surface housing 10 may be mounted by screwing in, pushing in, etc., so that the third part of the second bracket 61 is engaged with the notch 81, and the installation and disassembly of the downlight apparatus can be quickly accomplished.

Refer to FIG. 2 and FIG. 4. The edge-lit downlight apparatus further includes a driving module 90 located on the laminate 20. Particularly, the laminate 20 has a first side facing a forward direction 100 and a second side facing opposite to the forward direction 100, and the driving module 90 is located on the second side of the laminate 20.

Figure 6:
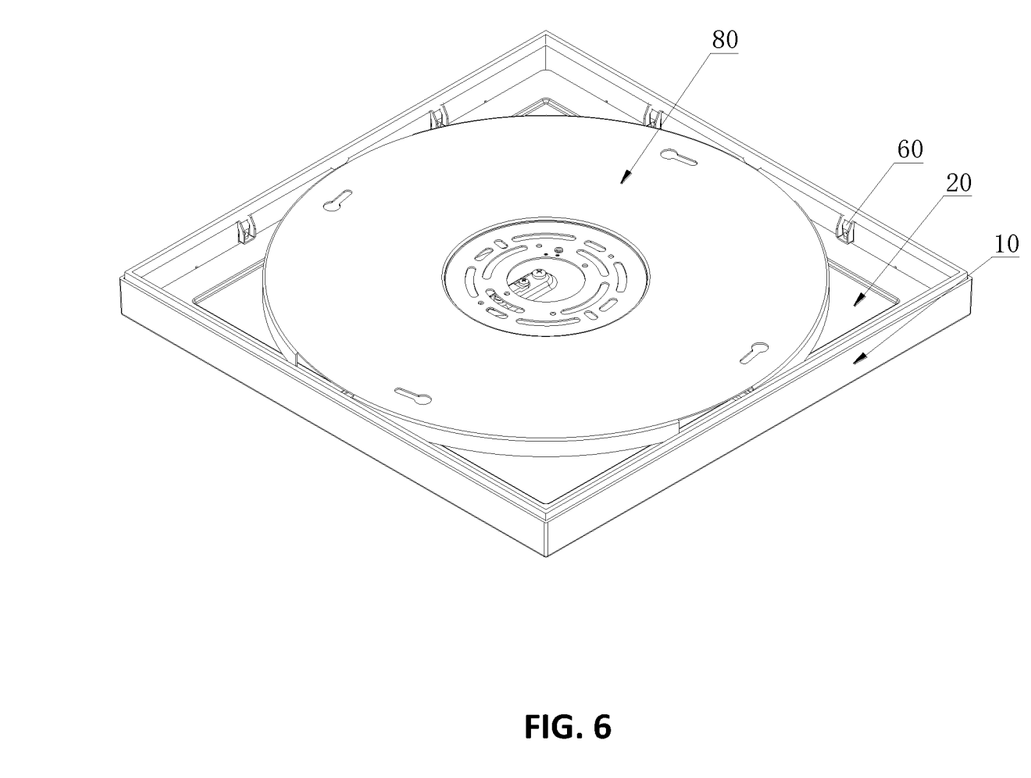
FIG. 6 is a schematic view of the edge-lit downlight apparatus in accordance with the second embodiment of the present disclosure.
Figure 7:
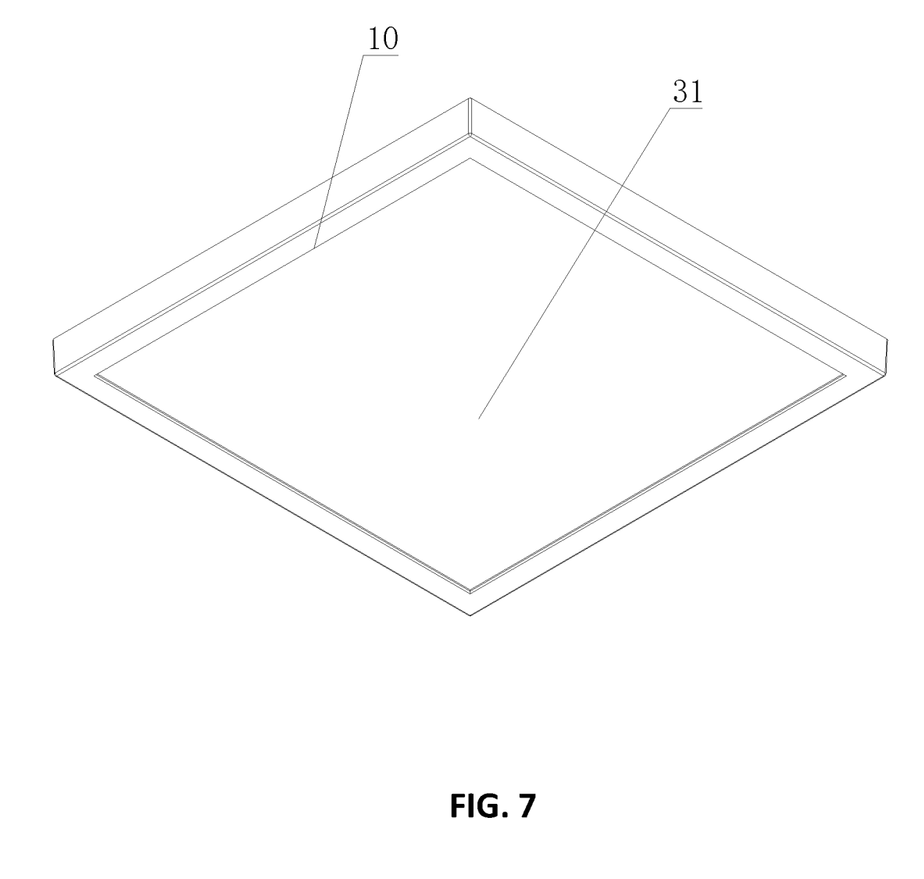
FIG. 7 is another perspective view of the edge-lit downlight apparatus in accordance with the second embodiment of the present disclosure.

FIG. 6 and FIG. 7 illustrate the second embodiment of the present disclose. The difference between the first embodiment and the second embodiment resides in that: in the second embodiment, the surface housing 10 is of a square structure. It can be understood that the structure of the surface housing 10 may also be in other shape.

In view of the above, the present disclosure discloses an edge-lit downlight apparatus configured with good structure, good heat dissipation, and good light-emitting effect. The edge-lit downlight apparatus is provided with the circuit board having the light module adhering to the surface housing via heat dissipation material. The circuit board may be flexible aluminum-based printed circuit board, and the surface housing may be made by plastic materials. The heat generated by the LED chips may be efficiently dissipated by the flexible aluminum-based printed circuit board and the surface housing, so as to extend the life cycle of the edge-lit downlight apparatus. The L-shaped first brackets engage with the fasteners to increase the dimension of the contact areas, so that the positioning between the components may be more precise and firmer. In this way, the misalignment or gap of the optical components due to assembly problems may be avoided. It can be understood that such misalignment or gap may cause water ripple, which results in poor light-emitting effect. With such configuration, the optical efficiency and light quality may be greatly enhanced. The water-proof foam and the mylar film are configured to enhance the waterproof level such that the edge-lit downlight apparatus may be safely adopted in a variety of applications. The back housing may be fixed onto the ceiling. Alternatively, the back housing may also be assembled on the pre-fabricated fixed structure, and then the body of the downlight apparatus may be screwed in, pushed in, etc., which is quick and convenient.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

We claim:

1. An edge-lit downlight apparatus, comprising:
   a surface housing having a base and a side wall;
   a laminate;
   a light guide module located between the surface housing and the laminate;
   a circuit board located in a space formed by the surface housing, the light guide module and the laminate, the circuit board has an inner surface wall and an outer surface wall;
   at least two first brackets, each of the first brackets includes a body and a contacting part, the body abuts against the side wall of the surface housing, the contacting part extends outward from the body and abuts against the laminate;
   a plurality of fasteners pass through the contacting parts of the first brackets, the laminate, and are removably connected to the surface housing;
   the outer surface wall of the circuit board contacts the side wall of the surface housing via a heat dissipation material, and
   a plurality of LED chips located on the inner surface wall of the circuit board.

2. The edge-lit downlight apparatus of claim 1, wherein the circuit board is ring-shaped or square-shaped.

3. The edge-lit downlight apparatus of claim 2, wherein the circuit board is an aluminum-based printed circuit board.

4. The edge-lit downlight apparatus of claim 3, wherein the circuit board is flexible.

5. The edge-lit downlight apparatus of claim 1, wherein the surface housing is made of plastic.

6. The edge-lit downlight apparatus of claim 1, wherein the light guide module includes a diffuser, a light guide plate, a light reflector, and a foam layer.

7. The edge-lit downlight apparatus of claim 6, wherein the surface housing has a first protrusion, the first protrusion is ring-shaped and coaxial with the surface housing.

8. The edge-lit downlight apparatus of claim 7, wherein the laminate abuts against the first protrusion.

9. The edge-lit downlight apparatus of claim 8, wherein the laminate has a recess around the center of the laminate, the recess abuts against the foam layer.

10. The edge-lit downlight apparatus of claim 9, wherein the edge-lit downlight apparatus further comprises a mylar film and a water-proof foam arranged between the second protrusion and the side wall of the surface housing.

11. The edge-lit downlight apparatus of claim 7, wherein the first protrusion has a top wall, the top wall has a second protrusion, the second protrusion is ring-shaped and coaxial with the surface housing.

12. The edge-lit downlight apparatus of claim 11, wherein the edge-lit downlight apparatus further comprises a back housing and at least two second brackets, each of the second brackets includes a first part, a second part, and a third part, the first part is connected to the laminate, the second part abut against the second protrusion, and the third part extends toward a center of the surface housing.

13. The edge-lit downlight apparatus of claim 1, wherein the at least two first brackets are L-shaped.

14. The edge-lit downlight apparatus of claim 1, wherein the edge-lit downlight apparatus further comprises a driving module located on the laminate.

15. The edge-lit downlight apparatus of claim 14, wherein the laminate has a first side facing a forward direction and a second side facing opposite to the forward direction, and the driving module is located on the second side of the laminate.

16. The edge-lit downlight apparatus of claim 1, wherein the surface housing has a first protrusion, the first protrusion is ring-shaped and coaxial with the surface housing.

17. The edge-lit downlight apparatus of claim 16, wherein the laminate abuts against the first protrusion.

18. The edge-lit downlight apparatus of claim 16, wherein the first protrusion has a top wall, the top wall has a second protrusion, the second protrusion is ring-shaped and coaxial with the surface housing.

19. The edge-lit downlight apparatus of claim 18, wherein the edge-lit downlight apparatus further comprises a back housing and at least two second brackets, each of the second brackets includes a first part, a second part, and a third part, the first part is connected to the laminate, the second part abut against the second protrusion, and the third part extends toward a center of the surface housing.

20. The edge-lit downlight apparatus of claim 18, wherein the edge-lit downlight apparatus further comprises a mylar film and a water-proof foam arranged between the second protrusion and the side wall of the surface housing.

\* \* \* \* \*